Figure 1:
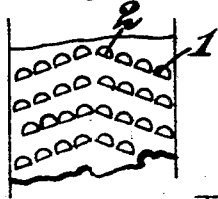

May 17, 1955     C. H. BOOTH     2,708,376
CUTTING AND ABRADING TOOLS
Original Filed Nov. 7, 1949

Inventor
Christopher Hodgson Booth
By Hoopes Leonard Buell
his attorneys

United States Patent Office 2,708,376
Patented May 17, 1955

2,708,376

CUTTING AND ABRADING TOOLS

Christopher Hodgson Booth, Bath, England, assignor to Firth-Brown Tools Limited, Sheffield, England, a British company Original application November 7, 1949, Serial No. 126,632. Divided and this application September 14, 1953, Serial No. 379,892

Claims priority, application Great Britain November 8, 1948

6 Claims. (Cl. 76—24)

The invention relates to cutting and abrading tools of the kind having a large number of cutting edges upstanding from the face of the tool and exemplified by files, rasps, and abrading bands and discs. It is an object of the invention to provide for use in tools of this kind new or improved cutting elements in which the cutting edges are formed on thin strip or sheet material, tools employing such elements and a method of making the elements.

The invention is based on the appreciation that in such tools the depth of cut by each individual cutting edge is very small and accordingly that, provided the chips or swarf may be cleared from the cutting edge, the depth of the edge may be correspondingly small. Further the pressure on each cutting edge is small and the body of the tool need only have sufficient strength and rigidity to support the edge and apply the necessary small cutting pressure. On the other hand it is important that the edge should be sharp to enable it to bite into the material and remove by cutting, the thin chip resulting from the small depth of cut.

Cutting or abrading tools which consist of a sheet of tin-plate or the like comparatively soft material having a multiplicity of abrading edges formed by striking out from the surface of the sheet parts of the peripheral edges of holes formed in the sheet and which are usually used for culinary purposes, are well known. The principle of providing cutting edges by striking out parts of the peripheries of holes in sheet material is employed in the present invention.

The invention provides the method of producing hardened cutting edges on the surface of a strip or sheet of thin flexible steel or other hardenable iron alloy to be used in or as a cutting tool, which method comprises the steps of striking out a multiplicity of portions of the strip or sheet material from the surface thereof to an extent at least equal to the thickness of the material and to make an acute angle with that surface, wholly or partly removing (e. g. by grinding down) the struck-out portions thereby to produce sharpened edges on the material at the peripheries of the holes therein, setting the sharpened edges to project from the general plane of the material and hardening the edges differentially with respect to the body of the material.

In the preferred form of the method the struck-out portions are removed as aforesaid by grinding and the heat developed during the grinding operation is employed to effect the hardening of the cutting edges.

Figure 2:
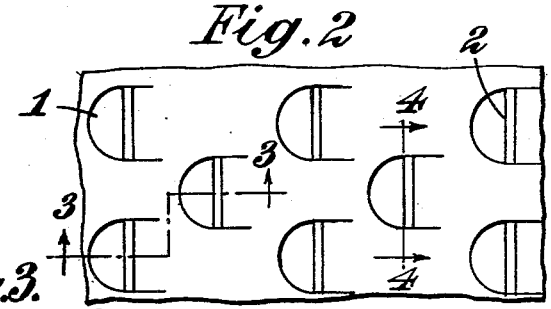
Figure 3:
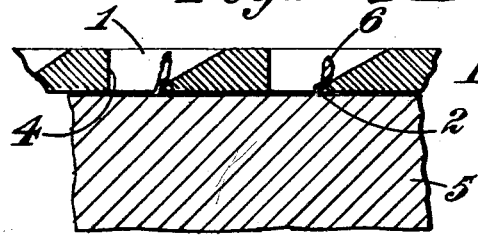
Figure 4:
Figure 5:
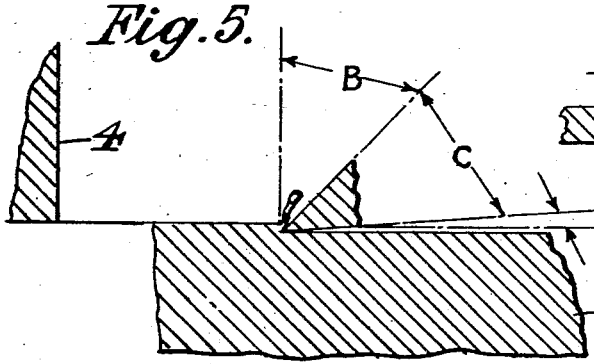
Figure 6:
Figure 8:
Figure 7:
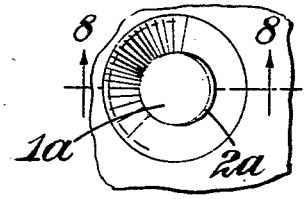

Some specific examples of cutting elements, of tools formed from the elements, and a method of manufacturing the elements will now be described with reference to the accompanying drawings which are to some extent diagrammatic and in which:

Figure 1 represents a portion of a cutting strip,
Figure 2 is an enlarged view of a part of the strip,
Figure 3 is a section on the line 3—3 in Figure 2,
Figure 4 is a section on the line 4—4 in Figure 2,
Figure 5 is a diagram illustrating the theoretical shape of one of the cutting edges, Figure 6 is a section showing an alternative form of strip having cutting edges on both sides,
Figure 7 is a view showing another form of cutting edge,
Figure 8 is a section on the line 8—8 in Figure 7,
Figures 9–11 illustrate three stages in the formation of the cutting edges employed in the construction shown in Figures 1–4.

The cutting strip illustrated in Figure 1 consists of a strip of sheet steel having in this example, a thickness of between 0.003 and 1/32 inch. The strip is formed with a multiplicity of D-shaped holes 1, which are arranged in V-shaped or chevron shaped rows, the holes in one row being staggered in relation to the holes in adjacent rows. The length of the straight edge of each hole is about 0.10 inch, adjacent holes in each row are pitched at approximately 0.175 inch apart, and the rows are pitched at approximately 0.175 inch apart. The straight edge of each hole is sharpened, hardened and set in the manner about to be described, to form a cutting edge and it will be understood that with the staggered arrangement of the rows and holes just described the edges in adjacent rows combine to provide in effect continuous cutting edges.

Figures 2–5 show in greater detail the form of the cutting edges. Each edge 2 has a clearance angle A relative to the surface 3 of the strip, an angle of rake B and an included angle C. Further, the extent by which the edge 2 set to project from the surface of the strip 3 increases from nil at the ends of the edge to about 0.015 of an inch at the centre. The extent of the projection will be varied for different uses to which the tool is to be put and may be more or less (e. g. 0.003 to 0.005 inch) than the height of 0.015 inch mentioned. In every case the height will be small. It will be seen from Figures 3 and 5 that the extent of the upset of the edge determines the depth of the cut which can be made, this depth being limited by the body of the strip engaging the work ahead of the edge. Figure 3 shows the cutting edges in operation on a workpiece 5 and it will be noticed that the chips 6 are directed through the holes 1.

Figure 6 shows a modified form of the strip in which cutting edges 2 are provided on both faces of the strip.

Figures 7 and 8 show an arrangement in which the holes 1a are of circular form and countersunk at an included C1 angle of about 30°. Over rather less than half the circumference of the hole the edge is set to project from the strip to form a cutting edge 2a, the extent of the projection increasing, as in the previous example, from nil at the ends to a few thousandths of an inch at the centre of the edge.

It is important that in every case the holes 1 should be of a size and shape to permit free passage of the cutting produced by the cutting edge and it may, sometimes, be desirable to vary the size of the holes according to the material which the tool is constructed to cut.

Figure 9:
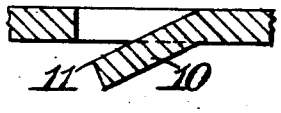
Figure 10:
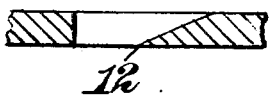
Figure 11:
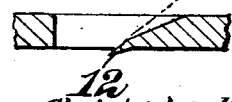

Figures 9–11 illustrate one method of forming on spring hardened steel strip or sheet material sharpened edges such as those shown in Figures 1–5. The first step in the formation of the edges is to strike out, by means of suitable punches and dies, D-shaped tongues 10 from the surface of the strip or sheet. The extent to which the free edge of each tongue is struck out is greater than the thickness of the material so that the edge 11 and the whole and preferably only the whole, of the semi-circular end of the tongue projects from the surface of the material. The tongue makes an angle with the surface of the material which is the desired included angle of the cutting edge. The next step in the method is to grind off the portion of the tongue which is above the surface of the material thereby leaving a straight sharp edge 12 as shown in Figure 10. The rate of grinding and the other conditions of the grinding operation, including the rate of cooling the material, are so determined that the heat developed in the material is sufficient to harden the edge 12 but not substantially to affect the body of the material. The next step is to set the edge 12 to constitute the cutting edge 2 as shown in Figure 11, the edge also being shaped as shown in Figure 4. The edges may be set by the use of suitable punches and dies and registration of the edges with the setting means may be effected by locating pins fitting into holes adjacent to those being treated. To complete the method the edges may be sandblasted to effect a final sharpening or they may be sharpened in any other suitable way. For some purposes this final step will not be necessary. If the method is to be applied to the production of edges on both sides of a sheet or strip as shown in Figure 6, the tongues are first struck out in opposed directions from a straight dividing line, the ends of the tongues being square in this case, and the operation of grinding and setting are carried out on both sides of the sheet or strip.

The angles of clearance and rake of the edges will be varied to suit the material on which the tool is intended to be used and will, in general, be about the same as the corresponding angles employed in a single point cutting tool to be used on the same material although the angles which may be employed in the present invention are not limited to those which may be employed in a single tool because the latter are governed to a greater extent by considerations of tool life. As examples of the angles which may be employed in a tool for cutting soft material such as wood and leather the clearance angle would be about 10–15°, the included angle 25–30° and the remainder from 90° would be the angle of rake. For harder material such as plastics, fibre, and the ductile metals (e. g. lead and aluminum) the clearance angle would be about 10°, the included angle 35–40° and the remainder the rake angle. For medium soft metals the clearance angle would be about 10° and the included angle 45–50° and for harder metals the clearance angle would be about 7° and the included angle 65–70°. The shear angle may be varied as is convenient.

I claim:

1. The method of forming hardened cutting edges upstanding from the surface of a piece of thin flexible hardenable-steel sheet, which method comprises the steps of striking out from the sheet a multiplicity of portions thereof all extending at acute angles with the surface of the sheet in the same general direction and the portions being struck out at least to the extent that one face of a part of each portion is brought beyond the level of the opposite face of the body of the sheet and the thickness of the said part lies outside the thickness of the sheet, removing the material of said part which lies outside of a plane which is parallel to the surface of the sheet and intersects the first mentioned face, thereby to produce for each struck-out portion a sharp edge at the intersection of said plane and face and at the periphery of a hole in the sheet, setting the edges to project with clearance angles from the general plane of said sheet and hardening the edges differentially with respect to the body of the sheet.

2. The method according to claim 1 in which the material is heated and cooled subsequently to the aforesaid removing operation to effect the hardening of the edges.

3. The method according to claim 1 in which the portions struck out are in the form of tongues.

4. The method according to claim 1 in which the edges are set as aforesaid with positive rake angles relative to the general plane of the said sheet.

5. The method of forming hardened cutting edges upstanding from the surface of a piece of thin flexible hardenable-steel sheet, which method comprises the steps of striking out from the sheet a multiplicity of portions thereof all extending at acute angles with the surface of the sheet in the same general direction and being struck out to the extent that one face of a part of each portion is brought at least to the level of the opposite face of the body of the sheet and the thickness of said part projects outside the thickness of the sheet, removing the material of said part which projects outside the plane of said face of the body of the sheet thereby to produce for each struck-out portion a sharp edge at the intersection of said plane and the first mentioned face, at the periphery of a hole in the sheet, setting the said edges to project from the general plane of the sheet and hardening the edges differentially with respect to the body of the sheet.

6. The method according to claim 5 in which the edges are set as aforesaid with angles of clearance and rake relative to the general plane of the said sheet.

References Cited in the file of this patent

UNITED STATES PATENTS

| 974,099 | Sundborg | Oct. 25, 1910 |

FOREIGN PATENTS

| 4,356 | Great Britain | Feb. 22, 1909 |